United States Patent
Drossel et al.

(10) Patent No.: US 10,557,457 B2
(45) Date of Patent: Feb. 11, 2020

(54) METHOD AND SYSTEM FOR CONTROLLING THE ACTIVE POWER OUTPUT OF A WIND FARM

(71) Applicant: Nordex Energy GmbH, Hamburg (DE)

(72) Inventors: Detlef Drossel, Norderstedt (DE); Florian Bode, Hamburg (DE)

(73) Assignee: Nordex Engery GmbH, Hamburg (DE)

( * ) Notice: Subject to any disclaimer, the term of this patent is extended or adjusted under 35 U.S.C. 154(b) by 0 days.

(21) Appl. No.: 15/919,843

(22) Filed: Mar. 13, 2018

(65) Prior Publication Data
US 2018/0258914 A1 Sep. 13, 2018

(30) Foreign Application Priority Data
Mar. 13, 2017 (EP) .................................. 17160517

(51) Int. Cl.
*F03D 7/04* (2006.01)
*H02J 3/38* (2006.01)
(Continued)

(52) U.S. Cl.
CPC ............. *F03D 7/048* (2013.01); *F03D 7/045* (2013.01); *H02J 3/386* (2013.01); *H02J 3/46* (2013.01);
(Continued)

(58) Field of Classification Search
CPC .......... F03D 7/048; F03D 7/045; H02J 3/386; H02J 3/46; H02J 2003/007; F05B 2270/335; Y02E 10/723
See application file for complete search history.

(56) References Cited

U.S. PATENT DOCUMENTS

| 2008/0150283 A1* | 6/2008 | Rivas | H02J 3/1885 290/44 |
| 2009/0055030 A1* | 2/2009 | Mayor | F03D 7/0284 700/287 |

(Continued)

FOREIGN PATENT DOCUMENTS

| DE | 102014000784 A1 | 7/2015 |
| DE | 102014000790 A1 | 7/2015 |

OTHER PUBLICATIONS

Anonymous; "Chapter 7.4—Control Paradigms: Model Following"; Engineering 360; on or before Dec. 31, 2005; 3 pages.

*Primary Examiner* — Tulsidas C Patel
*Assistant Examiner* — Joseph Ortega
(74) *Attorney, Agent, or Firm* — Barclay Damon LLP

(57) ABSTRACT

A method for controlling an active power in a wind farm comprises inputting an active power setpoint value into the wind farm model. Splitting the active power setpoint value of the wind farm among models of the wind turbines. Determining a modeled active power setpoint value of the wind farm as a sum of modeled active power setpoint values of the wind farm model. Determining a system deviation as a difference between the modeled active power setpoint value and an actual value of the active power output of the wind farm. Inputting the system deviation into a power controller which outputs a controller manipulated variable. Determining a feedforward controller manipulated variable independently of operating states of the wind turbines of the wind farm or the active power. Determining an overall manipulated variable as the sum of the freeforward controller manipulated variable ($u_{ff}$) and the controller manipulated variable.

13 Claims, 3 Drawing Sheets

(51) Int. Cl.
*H02J 3/46* (2006.01)
*H02J 3/00* (2006.01)

(52) U.S. Cl.
CPC ... *F05B 2270/335* (2013.01); *H02J 2003/007* (2013.01); *Y02E 10/723* (2013.01)

(56) References Cited

U.S. PATENT DOCUMENTS

| | | | | |
|---|---|---|---|---|
| 2011/0031762 | A1* | 2/2011 | Letas | H02J 3/1892 290/55 |
| 2013/0140817 | A1* | 6/2013 | Yin | F03D 7/00 290/44 |
| 2013/0162043 | A1* | 6/2013 | Ellena | H02J 3/38 307/43 |
| 2015/0088326 | A1* | 3/2015 | Fortmann | F03D 7/043 700/287 |
| 2015/0137518 | A1* | 5/2015 | Yin | F03D 7/0284 290/44 |
| 2015/0137520 | A1* | 5/2015 | Garcia | H02J 3/1885 290/44 |
| 2015/0184640 | A1* | 7/2015 | Fortmann | F03D 7/028 290/44 |
| 2015/0219074 | A1* | 8/2015 | Babazadeh | F03D 7/048 290/44 |
| 2015/0333677 | A1* | 11/2015 | Letas | H02J 3/386 290/44 |
| 2015/0345468 | A1* | 12/2015 | Schubert | F03D 7/0284 416/1 |
| 2015/0381089 | A1* | 12/2015 | Tarnowski | H02J 3/24 307/84 |
| 2016/0105093 | A1* | 4/2016 | Della Flora | H02J 3/383 363/55 |
| 2016/0233677 | A1* | 8/2016 | Douglass | H02J 3/14 |
| 2016/0237990 | A1* | 8/2016 | Ubben | H02J 3/1885 |
| 2016/0333852 | A1* | 11/2016 | Busker | F03D 7/0284 |
| 2016/0336888 | A1* | 11/2016 | Busker | H02P 9/105 |
| 2017/0292498 | A1* | 10/2017 | Garcia | F03D 7/048 |
| 2018/0097365 | A1* | 4/2018 | Adamczyk | H02M 1/32 |
| 2018/0159316 | A1* | 6/2018 | Aramaki | H02H 7/12 |
| 2018/0171976 | A1* | 6/2018 | Tan | F03D 7/0272 |
| 2018/0372074 | A1* | 12/2018 | Brombach | H02J 3/386 |

* cited by examiner

METHOD AND SYSTEM FOR CONTROLLING THE ACTIVE POWER OUTPUT OF A WIND FARM

CROSS REFERENCE TO RELATED INVENTION

This application is based upon and claims priority to, under relevant sections of 35 U.S.C. § 119, European Patent Application No. 17 160 517.3, filed Mar. 13, 2017, the entire contents of which are hereby incorporated by reference.

BACKGROUND

The present invention relates to a method for controlling the active power output of a wind farm, and also to a wind farm consisting of at least two wind turbines.

With increasing use of wind turbines, whether on land or at sea, the importance thereof to the electrical power supply increases. In view of feeding active power, predetermined setpoint values for the active power supplied at the power grid node should be observed as exactly as possible. This relates to both the stationary state in which—provided there is enough wind—a constant absolute value of active power is supplied and the dynamic behavior in which a setpoint value stipulation is varied over time.

DE 102014000790 A1 has disclosed a wind farm closed-loop control with an improved setpoint value behavior. The wind farm has a farm master having a power controller for controlling the wind turbines contained in the wind farm. A setpoint value for the power output of the wind farm is present at the farm master and said setpoint value is output for the wind turbine as setpoint value signals for the power output. The setpoint values for the wind turbines are corrected if there is a change in the setpoint value signal for the wind farm, with the corrected setpoint value being applied to the power controller. The setpoint value for the wind turbine is calculated using a predictor, with different operating states of the wind turbines and different power values being taken into account here.

DE 102014000784 A1 has disclosed a wind farm with a feedforward control in the power controller. The wind farm has a farm master embodied to control the wind turbines, the farm master comprising a power controller. The power controller has a feedforward control module which applies a measure for the setpoint power to the output of the power controller by way of a multiplication element. This is intended to obtain an accelerated response behavior of the feedforward control in the case of a setpoint value reduction and create a response behavior that is robust in relation to the operating state of the wind farm.

BRIEF SUMMARY OF THE INVENTION

The present invention is directed to specifying a method for controlling the active power output of a wind farm and of specifying such a wind farm, said method and wind farm implementing setpoint value specifications for the wind farm quickly and accurately using means that are as simple as possible.

A method for controlling the active power output of a wind farm having at least two wind turbines is disclosed. In principle, any other electrical variable of the wind farm may also be controlled in a similar fashion according to the disclosed method. The wind farm has at least two wind turbines, the power output of which is determined by a wind turbine controller in each case. The wind turbines may be of the same construction type or of different construction types. A setpoint value of the active power to be output by the wind farm is applied to a wind farm model which produces a modeled active power setpoint value of the wind farm. The modeled active power setpoint value corresponds to the setpoint value for the wind farm which the wind farm should, in sum, feed in at its power grid node with an energy supply network. The modeled active power setpoint value is applied to a power controller together with the actual value of the wind farm power that is output by the wind farm. Depending on the input variables present, the power controller provides a controller manipulated variable. A feedforward control manipulated variable determined independently of the states of the wind farm and its actual values is added to the controller manipulated variable to form an overall manipulated variable.

In an embodiment, the modeled active power setpoint value of the wind farm is determined from a sum of modeled active power setpoint values of the individual wind turbines in the wind farm. The setpoint value of the wind farm is split among models of the wind turbines contained in the wind farm, wherein the models in each case determine a modeled setpoint value of the active power of the respective wind turbine depending on the setpoint value of the wind farm apportioned to the respective model. The modeled active power setpoint value of the wind farm is formed or determined by many individual models which each map the behavior of the individual wind turbines, and so the respective modeled setpoint value for each wind turbine corresponds to the setpoint value determined for the respective wind turbine within the scope of model accuracy. An advantage of this modeling of the setpoint value is that it is not the behavior of the overall wind farm but the behavior of wind turbines that is modeled and hence it is possible to obtain good accuracy in the feedforward control. Depending on the configuration, one or more wind turbines may be formed in a model.

In an embodiment, the overall manipulated variable is split among the installation manipulated variables of the wind turbines in the wind farm. The overall manipulated variable determined with the additive feedforward control is split among installation manipulated variables in the method according to the invention. When present at the controllers of the individual wind turbines, the installation manipulated variables ascertained from the division may predetermine the active power to be provided by the wind turbine. When distributing the overall manipulated variable, it is important that the closed-loop control is effectuated toward a setpoint value that is predetermined for the wind farm, while the provision of the active power is effectuated by the split manipulated variables for the wind turbines. Here, the behavior of the overall wind farm is formed by the models of the wind turbines.

In an embodiment, the installation manipulated variables are determined in such a way that a value, corresponding to an installation manipulated variable, of the active power produced by the installation in each case corresponds to the modeled setpoint value of the active power of the wind turbine. In the method according to the invention, values predetermined for the entire wind farm are split into turbine-specific values at two points. A division is effectuated when forming the modeled active power setpoint values for the individual models of the wind turbines. The modeled active power setpoint values for the individual models of the wind turbines are determined from the active power setpoint value of the wind farm. The models of the wind turbines ascertain modeled active power setpoint values depending on the split active power setpoint values present, said modeled active power setpoint values then being added to form a modeled active power setpoint value of the wind farm. A further division is effectuated when providing split manipulated variables for the individual controllers of the wind turbines of the wind farm. The split manipulated variables are determined from the overall manipulated variable. The division of the overall manipulated variable to the installation manipulated variables can be effectuated on the basis of available active power values, for example, which are specified by the individual wind turbines or the controllers thereof. Likewise, the division of the active power setpoint value of the wind farm among the modeled active power setpoint values for the individual models of the wind turbines may be effectuated on the basis of the available active power specified by the individual wind turbines.

In a further embodiment, at least one state variable of the wind turbines is present in the respective models of the wind turbines in order to minimize a deviation between an actual value of the active power of the wind turbine and the modeled power value. Preferably, the state variable is information about a mode of operation that is active in the respective wind turbines. This is particularly advantageous if the modeling is implemented on a central wind farm control system. By reducing information to only such information relating to active modes of operation, it is possible to significantly reduce the data volume interchanged between the controllers of the wind turbines and the wind farm control system in a wind farm network if the models of the wind turbines know the corresponding modes. Examples of such a mode are a noise-reduced operation, a power-reduced operation on account of a defective component or a power-reduced operation on account of an operating temperature. In principle, such modes may describe any state relating to a specific wind turbine. Alternatively, or in a complementary manner, selected operating parameters of the individual wind turbines may also be provided as further state variables, for example information about a current rotational speed. For complex modeling methods, the wind farm network may be designed for a corresponding data volume and the modeling may be completely centralized in the wind farm. Thus, sufficient computational power and redundancy may be provided by a central server architecture, for example. Returning the state variables to the models does not mean that there is regulation of variables of the wind farm at the level of the individual wind turbines. Rather, the returned state variables of the wind turbines serve for the enablement of considering the current behavior of the wind turbines, which depends strongly on the modes of operation, during the modeling and avoiding deviations as a result of an incorrectly selected model approach. Thus, errors in the model formation are minimized or the dynamic behavior of the individual wind turbines is represented better with the aid of the returned state variables. Consequently, the modeled active power setpoint value of an individual wind turbine depends on the current state variables/modes of operation, just like the active power actually supplied by the wind turbine.

In an embodiment of the method according to the invention, the models for the wind turbines contained in the wind farm map specific parameters of the wind turbines. This means that the modeled active power value for differently configured wind turbines may also differ from one another.

In an embodiment, the wind farm comprises at least two wind turbines, further a wind farm control system at which an externally predetermined active power setpoint value for the active power to be supplied by the wind farm at its power grid node is present. The wind farm control system has a feedforward control unit which ascertains a feedforward control manipulated variable independently of operating states of the wind farm and the actual values thereof. Further, the wind farm control system has a wind farm model which is provided and configured to produce a modeled active power setpoint value of the wind farm from the setpoint value of the active power to be output by the wind farm. A subtraction element is configured to ascertain a system deviation from the modeled active power value ($P'_{set}$) of the wind farm and an actual value of the active power output by the wind farm. Further, a power controller is configured to ascertain or determine a controller manipulated variable from the system deviation.

In an embodiment, a summation element is configured to ascertain an overall variable as an active power setpoint value for the wind farm from the feedforward controller manipulated variable and the controller manipulated variable. The wind farm model may further comprise an installation model for each wind turbine contained in the wind farm. A portion of the active power to be output by the wind farm is present in the respective installation models. The models of the individual wind turbines are configured to ascertain a modeled active power setpoint value of the active power to be produced by the modeled wind turbine, depending on the respectively predetermined portion of the active power to be supplied by the wind farm.

The wind farm model is characterized by its installation models assigned to the wind turbines. In an embodiment, the installation models are configured to model the behavior of the respective individual wind turbines depending on the state variables present. As already described in conjunction with the method, the state variables may relate to information about the active modes of operation of the wind turbines and/or information in relation to operating parameters. The state variables are provided to the wind farm model or the models of the wind turbines from the individual wind turbines or the controllers thereof as input variables for the modeling.

Here, it is not necessary that only a single wind turbine from the wind farm is assigned to each installation model. A plurality of wind turbines may also be combined in one model. Such a combination may be effectuated on the basis of modes of operation that are present at the same time in the combined wind turbines. By way of example, a single model may model all wind turbines of the same construction type which are currently in a noise-reduced mode of operation. The active power to be produced by the wind farm is split, as an active power setpoint value, by a first division unit among the models of the individual wind turbines configured to ascertain a modeled active power setpoint value for the active power to be produced by the modeled installations on the basis of the appropriate installation model in a manner dependent on the split active power setpoint values present and dependent on at least one present state variable of the modeled wind turbine or wind turbines (in the case where a plurality of installations are combined). The first division unit is configured to split the predetermined active power setpoint value of the wind farm to the models for the wind turbines contained in the wind farm. By way of example, the division can be effectuated on the basis of available active power values which are specified by the individual wind turbines or the controllers thereof and which are present at the division unit as input variables. If installations are combined in a model, the first division unit of such a model specifies an aggregated value of the active power specified as available by these wind turbines. To this end, in a manner analogous to the models, state variables of the installations are present at the first division unit.

The wind farm model has a first summation element configured to sum the modeled active power setpoint values for the individual wind turbines to form a modeled active power setpoint value for the wind farm and provide the ascertained setpoint value to a subtraction element. The subtraction element of the wind farm control system is configured to provide a system deviation for a power controller of the wind farm control system depending on the present modeled active power setpoint value for the wind farm and a present actual value of the active power supplied at the power grid node of the wind farm. The power controller is configured to provide a controller manipulated variable depending on the system deviation present. The controller manipulated variable is present, together with the feedforward controller manipulated variable provided by the feedforward control unit, at a second summation element configured to form an overall manipulated variable for the active power output of the wind farm as a sum of the feedforward control manipulated variable and controller manipulated variable and provide said overall manipulated variable to a second division unit.

The second division unit of the wind farm control system is configured to split the overall manipulated variable for the active power to be output by the wind farm among setpoint values provided for the individual wind turbines and provide a corresponding active power setpoint value for the individual wind turbines or the controllers thereof. The division may be undertaken in a complementary manner in relation to the division of the active power setpoint value in the first division unit. The first division unit and the second division unit correspond to one another to the extent that the division of the setpoint value for the wind farm when determining the modeled setpoint value is effectuated in exactly the same way as a division and application of the installation manipulated variables for the wind turbine. Depending on the feedforward control and the employed models, the modeled setpoint values for the individual installations and the setpoint values provided by the second division unit for the individual installations only deviate slightly from one another, even in the case of significant changes of the input at the setpoint value present at the wind farm control system. Preferably, at least one state variable of one of the wind turbines is present at the respective model in order to minimize a deviation between the actual active power value of the wind turbine and the modeled active power setpoint value of the wind turbine.

A particular advantage is that the regulation of the active power to be supplied by the wind farm being broken down to producing wind turbines by way of the models which take account of the modes of operation of the individual wind turbines, and therefore being able to obtain better dynamics of the regulation of the active power. As a result of the park modeling, the modeled active power setpoint value of the wind farm approaches the actual value of the active power supplied at the power grid node of the wind farm and the system deviation at the subtraction member converges toward zero. Thus, the model compensates or reduces insufficient dynamics of the power controller.

BRIEF DESCRIPTION OF THE DRAWINGS

A preferred exemplary embodiment of the invention will be explained below. In the figures.

DETAILED DESCRIPTION OF THE INVENTION

Figure 1:
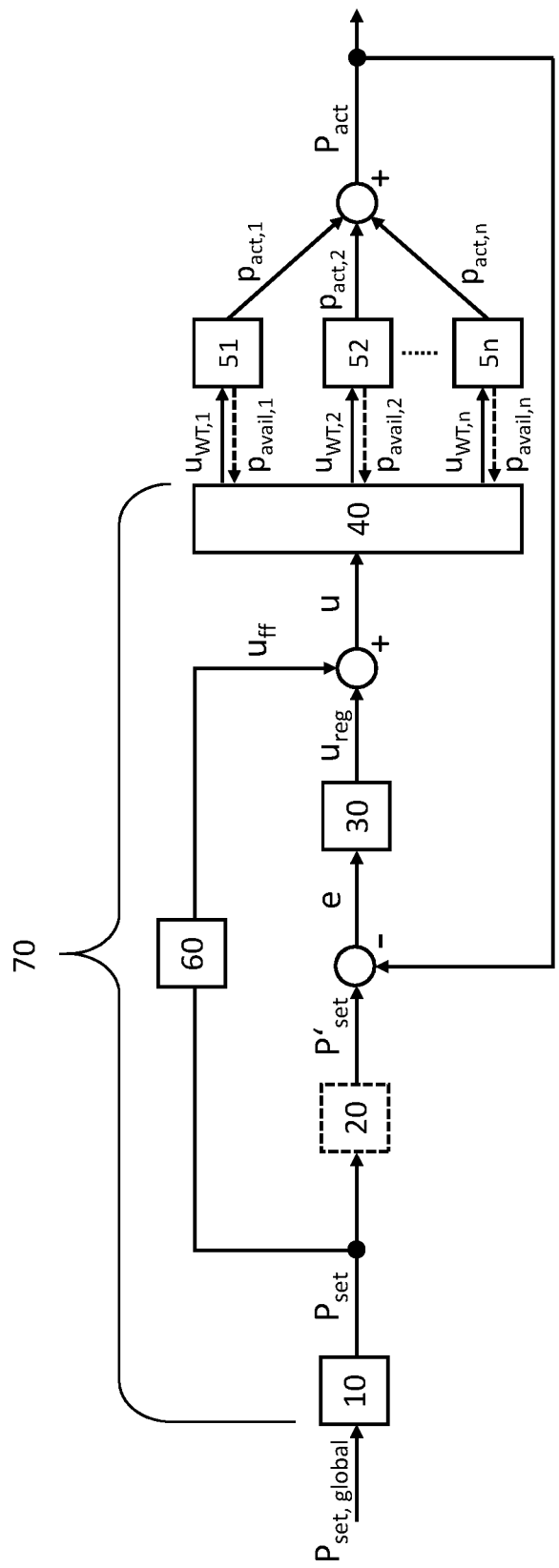
FIG. 1 illustrates a schematic diagram of a wind farm comprising an embodiment of a wind farm control system comprising feedforward control and a division of the manipulated variables among the individual wind turbines.

FIG. 1 illustrates how an externally predetermined active power setpoint value of the wind farm $P_{set,global}$ is applied to a limiting and ramp unit 10 of a wind farm control system 70. The active power setpoint value of the wind farm $P_{set,global}$ is an externally predetermined setpoint value for the active power to be output by the wind farm. This externally predetermined setpoint value may be predetermined for the wind farm by a logically superordinate unit of the power grid operator, for example. This predetermined setpoint value should be maintained so far and as accurately as possible at given wind conditions. In the ramp and limiting unit 10, the externally predetermined active power setpoint value for the wind farm is limited to the setpoint values and setpoint value jumps possible for the wind farm. Likewise, changes in the predetermined active power setpoint value are stabilized by ramps 10. In the art, the externally predetermined active power setpoint value may be considered to be a reference variable which is converted into a setpoint value by the ramp and limiting unit 10. The setpoint value for the active power stabilized thus is present in a wind farm model 20 of the wind farm control system 70.

The wind farm model 20 produces a modeled active power setpoint value $P'_{set}$ for the wind farm $P'_{set}$. The modeled active power setpoint value $P'_{set}$ specifies the response of the wind farm to the internal active power setpoint value $P_{set}$. The modeled active power setpoint value $P'_{set}$ may be considered to be an expected actual value specifying what actual value is produced in response to the setpoint value. A system deviation e is formed by a subtraction member of the wind farm control system 70 from the modeled active power setpoint value $P'_{set}$ and the measured actual value of the active power $P_{act}$ supplied at the power grid node of the wind farm. The system deviation e is the difference between the modeled active power setpoint value and actual value of the output active power. A controller manipulated variable $u_{reg}$ is ascertained from the manipulated variable e by way of a power controller 30 of the wind farm control system 70. The controller manipulated variable $u_{reg}$ specifies how regulation should be carried out on the basis of the wind farm model 20 and the power controller 30. If the model corresponds to the wind farm and the wind farm control system 70 is in its settled state, the manipulated variable e, and hence also the controller manipulated variable $u_{reg}$, will substantially disappear (equal zero).

The overall manipulated variable u is formed by a summation element of the wind farm control system 70, which provides the sum of the feedforward control manipulated variable $u_{ff}$ ascertained by a feedforward control unit 60 of the wind farm controller 70, and the controller manipulated variable $u_{reg}$. The feedforward control unit 60 is applied additively. Within the scope of the feedforward control, it is possible to dimension the power controller 30 with its time constants and its response behavior in accordance with the usual disturbance variables occurring in a wind farm. The overall manipulated variable u for the wind farm is split in a second division unit 40 of the wind farm control system 70 among the individual manipulated variables $u_{WT,1}$, $u_{WT,2}$, ..., $u_{WT,n}$, which form the manipulated variables for the individual wind turbines in the wind farm.

Each wind turbine in the wind farm has a controller. The controllers of the wind turbines 51, 52, ..., 5n are illustrated schematically in FIG. 1. In the division of the manipulated variables $u_{WT,1}$, $u_{WT,2}$, ..., $u_{WT,n}$ in the second division unit 40, the manipulated variables are split among the individual wind turbines in such a way that the summed active power produced by each wind turbine corresponds to the actual value of the active power $P_{act}$ to be output at the power grid node of the wind farm. Each wind turbine 51, 52, ..., 5n makes a contribution to the active power $P_{act}$ to be output by the wind farm. By way of example, when splitting the overall manipulated variable u, it is possible to take account of the fact that the wind turbines that are combined in the wind farm have different nominal powers. It is also possible here to take account of power reserves, maintenance work and other turbine-specific variables and specifications. In order to be able to follow the externally predetermined active power setpoint value $P_{set,global}$ quickly as possible, it is possible, for example, also to take into account different control times of the individual wind turbines during the division. By way of example, fast regulation can be ensured by virtue of the division of the setpoint value among the individual installations being effectuated on the basis of the power $p_{avail,1}$, $p_{avail,2}$, ..., $p_{avail,n}$ reported as available by the individual installations.

The more precise division of the manipulated variables $u_{WT,1}$, $u_{WT,2}$, ... $u_{WT,n}$ emerges from the more detailed design of the wind farm model 20 in FIG. 2. In the wind farm model 20 of the wind farm control system 70 (FIG. 1) the present internal active power setpoint value $P_{set}$ for the entire wind farm is split in a first division unit 210 among setpoint values for the individual wind turbines $p_{siml,1}$, $p_{siml,2}$, ..., $p_{siml,n}$. The split setpoint values are present in the respective model of the wind turbine 221, 222, ..., 22n. Output variables of the models for the wind turbines are the modeled active power setpoint values of the wind turbines $p_{simO,1}$, $p_{simO,2}$, ..., $p_{simO,n}$. These variables are added to form the modeled active power value $P'_{set}$.

Here, the models 221, 222, ..., 22n correspond either to individual wind turbines or to a plurality of wind turbines in the wind farm which were combined to form a group of wind turbines on account of technical peculiarities. By way of example, wind turbines of the same design, wind turbines with comparable wind locations and/or wind turbines with a comparable nominal power may be combined in a group.

An important aspect in the illustrated exemplary embodiment consists of the fact that the modeled active powers of the individual wind turbines $p_{simO,i}$ approximately correspond to the actual active power value of the wind turbine $P_{act,i}$. This means that the division of the setpoint value $P_{set}$ for the wind farm is effectuated in a manner that is complementary to the division of the manipulated variable u among the individual wind turbines.

Figure 2:
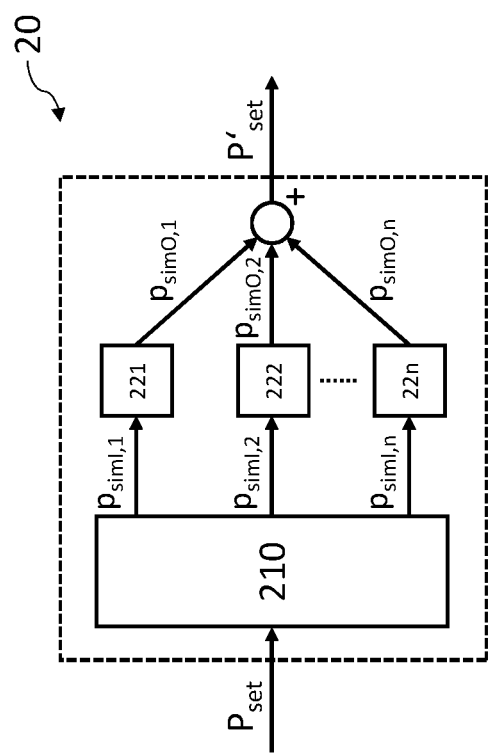
FIG. 2 illustrates a schematic diagram of an embodiment of a wind farm model from FIG. 1 with a division of a setpoint value for the wind farm among setpoint values for models of individual wind turbines.
Figure 3:
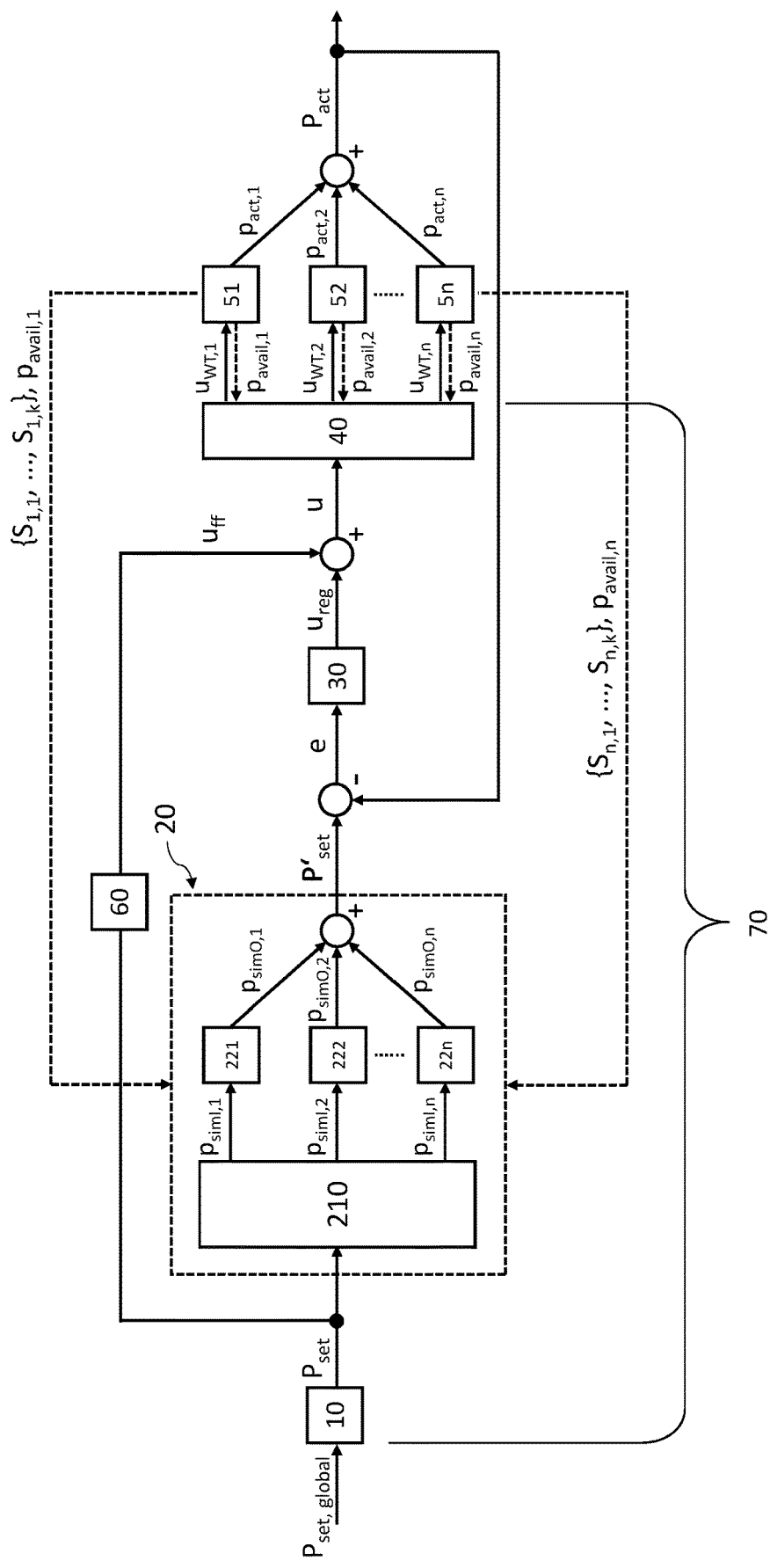
FIG. 3 illustrates a schematic diagram of a wind farm comprising an embodiment of a wind farm control system comprising a feedforward control and a wind farm model, in which state variables of the wind turbines are present, and a division of the manipulated variables among the individual wind turbines.

FIG. 3 shows an extension in relation to the block diagram illustrated in FIG. 1 by way of the combination with the wind farm model 20 illustrated in more detail in FIG. 2, in which a set of k state variables $\{S_{i,1}, S_{i,2}, \ldots S_{i,k}\}$ for the n-th wind turbine is transmitted to the models of the individual wind turbines. As a result of this, the models of the wind turbines 220, 221, ..., 22n can be adapted to the operating states in each case and the modeled active power setpoint values of the wind turbine $p_{simO,i}$ can be simulated better. In an embodiment, the n-th model of the wind turbine resorts to the k state variables $\{S_{i,1}, S_{1,2} \ldots S_{i,k}\}$ of the n-th wind turbine. Such an adaptation allows a more pronounced separation of the behavior of the reference variable from the behavior of the disturbance variables and thus said reference variable can follow a predetermined setpoint value in a better and more accurate manner. By way of example, for k=1, the state variable may correspond to the actual value of the supplied active power.

REFERENCE LIST

10 Limiting and ramp unit
20 Wind farm model
210 First division unit
221 Model of the 1st wind turbine
222 Model of the 2nd wind turbine
22n Model of the n-th wind turbine
30 Power controller
40 Second division unit for the overall manipulated variable
51 Controller of the 1st wind turbine
52 Controller of the 2nd wind turbine
5n Controller of the n-th wind turbine
60 Feedforward control unit
70 Wind farm control system
$P_{set, global}$ Externally predetermined active power setpoint value of the wind farm
$P_{set}$ Internal active power setpoint value of the wind farm
$p_{siml,1}$ Active power setpoint value split to the 1st wind turbine for modeling
$p_{siml,2}$ Active power setpoint value split to the 2nd wind turbine for modeling
$p_{siml,n}$ Active power setpoint value split to the n-th wind turbine for modeling
$p_{simO,1}$ Modeled active power setpoint value of the 1st wind turbine
$p_{simO,2}$ Modeled active power setpoint value of the 2nd wind turbine
$p_{simO,n}$ Modeled active power setpoint value of the n-th wind turbine
$P'_{set}$ Modeled active power setpoint value of the wind farm
$P_{act}$ Actual value of the active power supplied at the power grid node of the wind farm
e System deviation between modeled active power setpoint value and actual value of the output active power of the wind farm
$u_{reg}$ Controller manipulated variable
$u_{ff}$ Feedforward control manipulated variable
u Overall manipulated variable as the sum of the feedforward control manipulated variable and controller manipulated variable
$u_{WT,1}$ Split manipulated variable for the 1st wind turbine
$u_{WT,2}$ Split manipulated variable for the 2nd wind turbine
$u_{WT,n}$ Split manipulated variable for the n-th wind turbine
$p_{avail,1}$ Available active power of the 1st wind turbine
$p_{avail,2}$ Available active power of the 2nd wind turbine
$p_{avail,n}$ Available active power of the n-th wind turbine
$p_{act,1}$ Actual active power value for the 1st wind turbine
$p_{act,2}$ Actual active power value for the 2nd wind turbine
$p_{act,n}$ Actual active power value for the n-th wind turbine
$\{S_{1,1}, \ldots, S_{1,k}\}$ Set of k state variables of the 1st wind turbine
$\{S_{n,1}, \ldots, S_{n,k}\}$ Set of k state variables of the n-th wind turbine

The invention claimed is:

1. A method for controlling active power output ($P_{act}$) in a wind farm having at least two wind turbines, each having a wind turbine controller to control power output for each of the at least two wind turbines, the method comprising:
   inputting an active power setpoint value ($P_{set}$, $P_{set,global}$) of the wind farm into a wind farm model;
   splitting the active power setpoint value ($P_{set}$, $P_{set,global}$) of the wind farm among models of each of the at least two wind turbines;
   determining a modeled active power setpoint value ($P'_{set}$) of the wind farm as a sum of modeled active power setpoint values ($p_{simO,1}$, $p_{simO,2}$, $p_{simO,n}$) of the wind farm model, wherein the modeled active power setpoint values ($p_{simO,1}$, $p_{simO,2}$, $p_{simO,n}$) depend on a portion of the active power setpoint values ($p_{simI,1}$, $p_{simI,2}$, $p_{simI,n}$) apportioned to the respective models of each of the at least two wind turbines;
   determining a system deviation (e) as a difference between the modeled active power setpoint value ($P'_{set}$) and an actual value of the active power output ($P_{act}$) of the wind farm;
   inputting the system deviation (e) into a power controller which outputs a controller manipulated variable ($u_{reg}$);
   determining a feedforward controller manipulated variable ($u_{ff}$) independently of operating states of the at least two wind turbines of the wind farm or the actual value of the active power output ($P_{act}$); and
   determining an overall manipulated variable (u) as a sum of the feedforward controller manipulated variable ($u_{ff}$) and the controller manipulated variable ($u_{reg}$).

2. The method of claim 1, wherein behavior of the wind farm is represented by the models of each of the at least two wind turbines.

3. The method of claim 1, wherein the overall manipulated variable (u) is split into manipulated variables for individual wind turbines ($u_{WT,1}$, $u_{WT,2}$, $u_{WT,n}$).

4. The method of claim 1, wherein at least one state variable ($S_{1,1}, \ldots, S_{1,k}, S_{n,1}, \ldots, S_{n,k}$) of one of the at least two wind turbines is present in the respective model of one of the at least two wind turbines in order to minimize a deviation between the actual active power value of the at least two wind turbines ($n_{act,1}$, $p_{act,2}$, $p_{act,n}$) and the modeled active power setpoint values ($p_{simO,1}$, $p_{simO,2}$, $p_{simO,n}$) of the wind farm model.

5. The method of claim 4, wherein the at least one state variable of each individual wind turbine comprise information about rotational speed.

6. The method of claim 1, wherein the models of each of the at least two wind turbines of the wind farm represent configuration parameters of each individual wind turbine.

7. A wind farm control system for a wind farm having at least two wind turbines and a setpoint value for an active power ($P_{set}$, $P_{set,global}$) for controlling the at least two wind turbines that is configured to be output by the wind farm and input into the wind farm control system, the wind farm control system comprising:
   a feedforward control unit configured to determine a feedforward control manipulated variable ($u_{ff}$) independently of operating states of the at least two wind turbines of the wind farm and an actual value of the active power ($P_{act}$);
   a wind farm model configured to output a modeled active power value ($P'_{set}$) of the wind farm from the setpoint value for the active power ($P_{set}$, $P_{set,global}$);
   a subtraction unit configured to determine a system deviation (e) from a difference between the modeled active power value (P'set) of the wind farm and the actual value of the active power ($P_{act}$) output by the wind farm;
   a power controller configured to determine a controller manipulated variable ($u_{reg}$) based on the system deviation (e); and
   a summation unit configured to determine an overall manipulated variable (u) as the active power setpoint value for the wind farm from a sum of the feedforward control manipulated variable ($u_{ff}$) and the controller manipulated variable ($u_{reg}$),
   wherein the wind farm model comprises wind turbine models for each of the at least two wind turbines, and
   wherein a portion ($p_{simI}$) of the actual value of the active power ($P_{act}$) to be output by the wind farm is input into each model of the at least two wind turbines, and wherein each wind turbine model is configured to determine a modeled active power setpoint value of the active power ($p_{simO}$) to be output by an individual wind turbine.

8. The wind farm control system of claim 7, further comprising a first apportioning unit configured to distribute the setpoint value for the active power ($P_{set}$) of the wind farm to the models of each of the at least two wind turbines of the wind farm.

9. The wind farm control system of claim 8, further comprising a second summation unit configured to sum together the modeled active power setpoint values ($p_{simO,1}$, $p_{simO,2}$, $p_{simO,n}$) for the models of the at least two wind turbines, wherein the sum is input into the subtraction unit.

10. The wind farm control system of claim 8, further comprising a second apportioning unit configured to distribute the overall manipulated variable (u) to manipulated variables for individual wind turbines ($u_{WT,1}$, $u_{WT,2}$, $u_{WT,n}$) of the wind farm.

11. The wind farm control system of claim 7, wherein at least one state variable ($S_{1,1}, S_{1,k}, S_{n,1}, \ldots, S_{n,k}$) of one of the at least two wind turbines is input into a respective model of one of the at least two wind turbines in order to minimize a deviation between the actual active power value of an individual wind turbine ($p_{act,1}$, $p_{act,2}$, $p_{act,n}$) and the modeled active power value ($p_{simO,1}$, $p_{simO,2}$, $p_{simO,n}$) of the individual wind turbine.

12. The wind farm control system of claim 11, wherein the at least one state variable of each individual wind turbine comprises information about rotational speed.

13. The wind farm control system of claim 7, wherein the models of each of the at least two wind turbines of the wind farm represent configuration parameters of each individual wind turbine.

* * * * *

UNITED STATES PATENT AND TRADEMARK OFFICE
CERTIFICATE OF CORRECTION

PATENT NO. : 10,557,457 B2  
APPLICATION NO. : 15/919843  
DATED : March 13, 2018  
INVENTOR(S) : Detlef Drossel and Florian Bode Page 1 of 1

It is certified that error appears in the above-identified patent and that said Letters Patent is hereby corrected as shown below:

Claim 4:
Column 9
Line 43 change "$(n_{act,1}, p_{act,2}, p_{act,n})$" to --$(p_{act,1}, p_{act,2}, p_{act,n})$--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*